United States Patent
Simons et al.

(10) Patent No.: US 8,006,518 B2
(45) Date of Patent: Aug. 30, 2011

(54) METHOD FOR MANUFACTURING A PREFORM FOR OPTICAL FIBRES

(75) Inventors: Dennis Robert Simons, Eindhoven (NL); Jelle Philip Terpsma, Eindhoven (NL); Frans Gooijer, Eindhoven (NL)

(73) Assignee: Draka Comteq, B.V., Amsterdam (NL)

( * ) Notice: Subject to any disclaimer, the term of this patent is extended or adjusted under 35 U.S.C. 154(b) by 1428 days.

(21) Appl. No.: 10/959,331

(22) Filed: Oct. 7, 2004

(65) Prior Publication Data

US 2005/0120751 A1 Jun. 9, 2005

(30) Foreign Application Priority Data

Oct. 8, 2003 (NL) .................................. 1024480

(51) Int. Cl.
*C03B 37/018* (2006.01)
(52) U.S. Cl. ............. 65/417; 65/419; 65/420; 65/391
(58) Field of Classification Search .............. 65/419, 65/417, 420, 418, 391
See application file for complete search history.

(56) References Cited

U.S. PATENT DOCUMENTS

| | | | |
|---|---|---|---|
| 4,162,908 A | 7/1979 | Rau et al. | |
| 4,675,038 A | 6/1987 | Ainslie et al. | |
| 4,854,956 A * | 8/1989 | Pluijms et al. | 65/391 |
| 5,194,714 A * | 3/1993 | Le Sergent | 219/121.36 |
| 5,356,448 A | 10/1994 | Dumas et al. | |
| 5,861,047 A | 1/1999 | Flemming, Jr. et al. | |
| 6,253,580 B1 * | 7/2001 | Gouskov et al. | 65/391 |
| 6,260,510 B1 | 7/2001 | Breuls et al. | |
| 6,718,801 B1 | 4/2004 | Breuls et al. | |
| 2003/0115908 A1 * | 6/2003 | Hammerle et al. | 65/379 |
| 2005/0000253 A1 * | 1/2005 | Xie et al. | 65/417 |
| 2005/0022561 A1 * | 2/2005 | Guskov et al. | 65/391 |
| 2005/0120751 A1 | 6/2005 | Simmons et al. | |
| 2006/0112734 A1 * | 6/2006 | Kim et al. | 65/489 |

FOREIGN PATENT DOCUMENTS

| | | |
|---|---|---|
| DE | 101 55 134 C1 | 12/2002 |
| EP | 0 127 227 | 12/1984 |
| EP | 0 401 742 | 12/1990 |
| JP | 2003286033 A * | 10/2003 |
| KR | 1020040065111 A | 7/2004 |
| NL | 1022140 C2 | 6/2004 |
| WO | 01/05721 A1 | 1/2001 |
| WO | 2004/063104 A1 | 7/2004 |
| WO | 2005/011354 A2 | 2/2005 |
| WO | 2005/033028 A1 | 4/2005 |
| WO | 2005/033208 A1 | 4/2005 |

OTHER PUBLICATIONS

International Search Report in corresponding International Application No. PCT/NL2004/000699, dated Jan. 5, 2005.

(Continued)

*Primary Examiner* — Queenie Dehghan
(74) *Attorney, Agent, or Firm* — Summa, Additon & Ashe, P.A.

(57) ABSTRACT

The present invention relates to a method for manufacturing a preform for optical fibers, wherein deposition of glass-forming compounds on the substrate takes place. The present invention furthermore relates to a method for manufacturing optical fibers, wherein one end of a solid preform is heated, after which an optical fibre is drawn from said heated end.

16 Claims, 1 Drawing Sheet

OTHER PUBLICATIONS

Dutch Search Report in corresponding Dutch Application No. 1024480, dated Oct. 8, 2003.
Office Action in corresponding European Application No. 04774996, dated Sep. 12, 2006.
Korean Application No. 10-2003-0002751, filed on Jan. 15, 2003 (Korean counterpart to Examiner-cited U.S. Patent Pub. 2006/0112734).
Chinese First Office Action in counterpart Chinese Application No. 200480029544.5, dated Jan. 16, 2009.
Machine translation of JP 2003-286033 [Provided by Examiner in Office Action mailed on Aug. 12, 2008].
International Preliminary Report on Patentability in counterpart International Application No. PCT/NL2004/000699, issued Apr. 10, 2006.
Office Action in counterpart European Application No. 04774996, dated Nov. 4, 2009.
Matthijsse, et al., "Towards the low limits of 1383 nm loss in PCVD enabled single mode fibre production," Feb. 2004, OFC, Los Angeles, CA.
European Office Action in counterpart European Application No. 04774996.5 dated Jun. 7, 2010.
European Patent Office Notice of Allowance in counterpart European Application No. 04774996 dated Dec. 23, 2010, pp. 1-16.

* cited by examiner

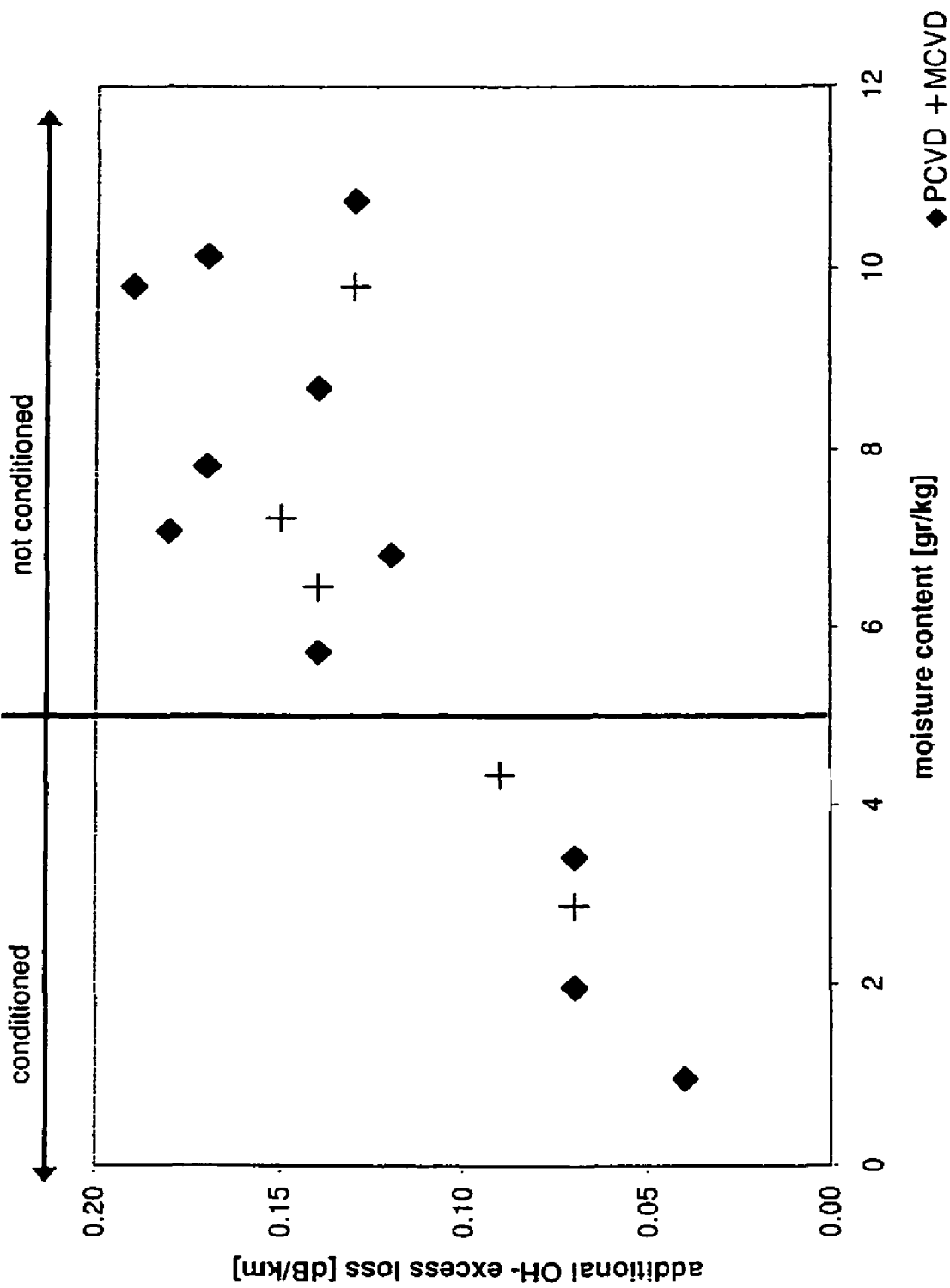

METHOD FOR MANUFACTURING A PREFORM FOR OPTICAL FIBRES

The present invention relates to a method for manufacturing a preform for optical fibres, wherein deposition of glass-forming compounds on a substrate takes place. The present invention furthermore relates to a method for manufacturing optical fibres, wherein one end of a solid preform is heated, after which an optical fibre is drawn from said heated end.

BACKGROUND OF THE INVENTION

The deposition of glass layers on the interior of a substrate tube, wherein one or more reactive gases and an oxygen-containing gas are supplied to said substrate tube, is known per se, for example from U.S. Pat. No. 6,260,510 in the name of the present applicant. According to the method that is known therefrom, layers of silicon dioxide, which may or may not be doped (e.g. germanium-doped silicon dioxide), are coated onto the interior surface of a substrate tube consisting of quartz glass, for example. Such a deposition reaction may be carried out by positioning the substrate tube along the cylindrical axis of the resonant cavity and subsequently flushing the inside of the tube with a gaseous mixture comprising oxygen, silicon chloride and germanium chloride, for example. Following that, a localized plasma is generated within the cavity so as to produce direct deposition of germanium-doped silicon dioxide on the interior surface of the substrate tube. Since such deposition only occurs in the vicinity of the localized plasma, the resonant cavity (and thus the plasma) must be swept along the cylindrical axis of the substrate tube in order to coat the substrate tube uniformly along the entire length thereof. When the deposition of the layers is completed, the substrate tube is thermally treated in such a manner that it will contract into a rod, which rod is also called an optical preform. If the end of the optical preform is heated in such a manner that said end starts to melt, an optical fibre can be drawn from the rod and be wound onto a reel. Such an optical fibre thus has a core-cladding portion corresponding to that of the optical preform. Because a germanium-doped core has a higher refractive index than the undoped cladding, for example, the fibre can act as a waveguide, viz. for use in propagating optical telecommunication signals. It should be noted, however, that the gaseous mixture that is flushed through the inner part of the substrate tube may also contain other components; a fluor-containing compound may be added, causing a reduction in the refractive index of the doped silicon dioxide.

European patent application No. 0 401 742 relates to an OVD process wherein silicon dioxide free from hydroxyl ions is deposited on a substrate, which substrate is localized in a space that is separated from the surrounding atmosphere.

U.S. Pat. No. 4,162,908 relates to a method for manufacturing a preform, wherein dichlorodifluoromethane is introduced into the flame of the plasma burner; further information with regard to a conditioned atmosphere cannot be derived from said publication, however.

German Patentschrift No. 101 55 134 relates to a method for manufacturing a preform wherein the OH content is minimised; said publication makes no mention of the deposition process being carried out in an environment in which the substrate is present in a conditioned atmosphere, in particular a moisture content lower than that of a non-conditioned atmosphere.

The use of such a fibre for telecommunication purposes requires the fibre to be substantially free from contamination, since such contamination can cause serious attenuation of the signal being carried if great fibre lengths are used. As a result, it is important not only that the aforesaid PCVD process be highly uniform, but also that the reactive gases used for the deposition do not contain any undesirable impurities. During the aforesaid chemical vapour deposition, the hydrogen atoms can thus form —OH-bonds in the glass layers that have been deposited on the interior of the substrate tube, which —OH-bonds have a strongly adverse effect on the transmission spectre of a fibre drawn from an optical preform, in particular on account of the strong absorption thereof at 1240 nm and 1385 nm. Such absorption losses due to the presence of small amounts of impurities in the gaseous starting material can amount to 10-20 dB/km of a wavelength of 1385 nm. Although prior art methods exist for preventing the incorporation of such —OH-groups into the optical glass fibre, for example by carrying out a chlorination step following the deposition step in the case of porous glass structures, as known from U.S. Pat. No. 4,675,038, or by adding fluorine during the chemical vapour deposition reaction, for example, as known from European patent application No. 0 127 227, both prior art methods have this drawback that an additional amount of chlorine or fluorine, respectively, will find its way in the final glass structure, leading to increased attenuation losses caused by Rayleigh scattering.

Light conduction takes place in a small part of an optical glass fibre, viz. the optical core, and a small part of the cladding surrounding said core. It is important, therefore, that optical preforms from which an optical glass fibre is drawn, which glass fibre is responsible for the light conduction, be free from impurities, in particular hydroxyl groups.

SUMMARY OF THE INVENTION

One aspect of the present invention is thus to provide a method for manufacturing a preform that is substantially free from hydroxyl groups.

Another aspect of the present invention is to provide a method for manufacturing optical fibres, which optical fibres exhibit small attenuation losses caused by hydroxyl groups, which exhibit a strong absorption peak at 1240 nm and 1385 nm.

BRIEF DESCRIPTION OF THE DRAWINGS

FIG. 1 depicts attenuation losses as a function of moisture content for both PCVD and MCVD processes.

DETAILED DESCRIPTION OF THE INVENTION

The invention as referred to in the introduction is characterized in that the deposition step is carried out in an environment in which the substrate is present in a conditioned atmosphere, which conditioned atmosphere has a moisture content lower than that of the non-conditioned atmosphere.

It has appeared to be possible to achieve a significant reduction of the attenuation losses caused by hydroxyl groups by conditioning the environment in which the preforms for the glass fibre production are manufactured. The term "conditioned atmosphere" is to be understood to mean an atmosphere having a significantly lower moisture content than the atmosphere that has generally been used so far.

For an internal deposition process in which glass-forming compounds are added to the interior of a substrate tube, which substrate tube is contracted into a solid preform, it is desirable that the contraction step be carried out in an environment in which the atmosphere is conditioned, which conditioned atmosphere has a moisture content lower than that of the non-conditioned atmosphere. Further embodiments of the present invention are defined in the appended claims.

Preferably, the moisture content of the conditioned atmosphere is lower than 5 g/kg, the moisture content of the conditioned atmosphere is in particular lower than 2 g/kg. When moisture content values below 5 g/kg are used, the reduction of the attenuation is significant in comparison with the spread in attenuation levels that occurs when normal moisture content values are used in a non-conditioned atmosphere, in which the moisture content usually ranges between 8 and 12 g/kg. This strong decrease at a moisture content of approximately 5 g/kg is assumed to be caused by the sub-saturation of the water molecules on the substrate surface, although the present inventors do not wish to be bound to such a theory. In the case of a value higher than 5 g/kg, the attenuation losses and the spread thereof are substantially independent of the moisture content at which it is assumed that the water molecules are fully adsorbed to the substrate surface, so that a further increase of the moisture content will not lead to higher attenuation losses. The moisture content at an ambient temperature of 20° C. in a non-conditioned atmosphere is e.g. 10.1 g/kg with a relative humidity level of 75% and 5.8 g/kg with a humidity level of 40%. The appended figure shows the results of experiments carried out in accordance with the present invention, within the framework of which experiments both PCVD and MCVD have been examined.

The present inventors have furthermore found that a further attenuation reduction can be achieved by placing the machine in which the deposition and/or the contraction take place in an environment having a low moisture content for a prolonged period of time. After about 10 days, an additional reduction of about 0.01 dB/km is obtained in this manner. The present inventors assume that this has something to do with the ambient atmosphere leaking into the machine and the adsorption of water molecules on interior parts of the machine through which the reactive gases flow. It is important, therefore, to maintain the low moisture content in the environment for at least 7 days.

Such a reduction of the moisture content provides a significant reduction of the attenuation losses in comparison with an embodiment that is known from the prior art, in which the deposition step as well as a possible contraction step are carried out in the ambient air or a non-conditioned environment, without the moisture content being reduced. Although the term "conditioned atmosphere" is used herein, it should be understood that also gases other than dried air may be used for conditioning the environment, wherein the moisture content thereof is in particular lower than 5 g/kg, more in particular lower than 2 g/kg.

The deposition step of the present invention is carried out by using a PCVD process or an MCVD process, PCVD and MCVD being so-called internal deposition techniques.

Outside Vapour Deposition (OVD) and Vapour Axial Deposition (VAD) can be considered to be external vapour deposition processes for manufacturing optical preforms. Both the OVD process and the VAD process use a hydrogen/oxygen burner for depositing silicon dioxide, which may be doped, in so-called "soot" (unsintered) form. The glass-forming precursors are introduced into the flame and react therein, forming an oxide particle that precipitates on a substrate. A cylindrical substrate is used for manufacturing OVD core rods, on the exterior of which substrate the soot particles are deposited. After the deposition process, the substrate is removed and the hollow soot-like tube is sintered and closed. The OVD process is also used for overcladding core rods that have been manufactured by using the OVD process or another technique. In such an embodiment, the soot particles are deposited on a rod that has already been (partially) sintered, after which the whole is sintered so as to obtain a composite preform. With the VAD process, the growth of a "soot"-like rod takes place in axial direction, which means that the preform becomes longer and longer during the deposition process. Such a VAD rod is also sintered to form a solid rod after the deposition of soot, after which overcladding of the rod may take place, for example by means of the OVD process. It should be understood that the present invention does not relate to the carrying out of a sintering step in a conditioned environment, but that the present invention explicitly relates to the deposition of glass-forming compounds on a substrate, possibly followed by a contraction step for forming the substrate into a solid preform, which deposition and contraction steps are preferably carried out in a conditioned atmosphere, in which the conditioned atmosphere has a moisture content lower than that of the non-conditioned atmosphere that is conventionally used.

Using the PCVD process, a low-pressure plasma prevailing in the interior of a substrate tube is reciprocated along the longitudinal axis of the substrate tube, as a result of which layers are deposited on the interior of the substrate tube. After layers have been deposited in this manner, the substrate tube is contracted into a solid rod by subjecting it to an external heat treatment. The moisture content of the environment in which the formation of said solid rod takes place, preferably during both the PCVD process and the contraction process, is reduced by means of an air conditioning system, in which moisture is extracted from the air to achieve a moisture content of less than 5 g/kg. A number of solid rods were produced, using different moisture content values, which rods were subsequently formed into optical fibres. Then the attenuation losses of said optical fibres at a wavelength of 1385 nm were measured. Using the MCVD process, in which the deposition on the interior of the substrate tube was effected by means of a heat source positioned outside the substrate tube, for example a reciprocating hydrogen/oxygen burner, furnace or plasma flame, and a subsequent contraction step, optical preforms were made, from which optical fibres were drawn, of which optical fibres the attenuation losses at the aforesaid wavelength were measured. A conditioned atmosphere having a reduced moisture content was used both in the deposition step and in the contraction step. The appended figure shows the attenuation losses as a function of the moisture content both for PCVD and for MCVD. The results of the experiments show that for MCVD the attenuation losses amount to about 0.14 dB/km with a moisture content of more than 5 g/kg, which losses slightly increase or decrease as the moisture content further increases. When the moisture content is reduced to a value below 5 g/kg, a significant decrease can be observed. The same trend was measured with PCVD, in which the attenuation losses were even reduced to a value of less than 0.05 dB/km with a moisture content of less than 2 g/kg.

The invention claimed is:

1. A method for manufacturing a preform for optical fibres, wherein deposition of glass-forming compounds on a glass substrate tube takes place, characterized in that the deposition step is a chemical vapor deposition step carried out in an environment in which the glass substrate tube is present in a conditioned atmosphere having a moisture content of less than 5 g/kg, wherein the deposition step is a PCVD deposition step or an MCVD deposition step that takes place on the interior of the glass substrate tube, after which the glass substrate tube is contracted into a massive preform.

2. A method according to claim 1, characterized in that said contraction step is carried out in an environment in which the atmosphere is conditioned, which conditioned atmosphere has a moisture content of less than 5 g/kg.

3. A method according to claim 1, characterized in that the deposition step is a PCVD deposition step.

4. A method according to claim 1, characterized in that the deposition step is an MCVD deposition step.

5. A method according to any one of claims 1, 2, 3 and 4, characterized in that the moisture content of the conditioned atmosphere is less than 2 g/kg.

6. A method for manufacturing optical fibres, wherein one end of a massive preform is heated, after which an optical fibre is drawn therefrom, using a massive preform obtained by carrying out a method as defined in any one of claims 1, 2, 3 and 4.

7. A method for making an optical preform, comprising:
providing a reduced-moisture environment having a moisture content of less than 5 g/kg to promote attenuation-reducing deposition of glass-forming compounds on a glass substrate tube;
placing the glass substrate tube within the reduced-moisture environment;
depositing glass-forming compounds onto the interior surface of the glass substrate tube via PCVD deposition or MCVD deposition, wherein the glass deposition proceeds while the glass substrate tube remains in the reduced-moisture environment, which is maintained at a moisture content of less than 5 g/kg; and
thereafter, contracting the glass substrate tube into an optical preform.

8. A method according to claim 7, wherein the deposition step proceeds in a reduced-moisture environment that is maintained at a moisture content of less than 2 g/kg.

9. A method according to claim 7, wherein the contraction step is performed in a reduced-moisture environment having a moisture content of less than 5 g/kg.

10. A method according to claim 9, wherein the contraction step is performed in a reduced-moisture environment having a moisture content of less than 2 g/kg.

11. A method according to claim 7, wherein the deposition step comprises a PCVD deposition step.

12. A method for making an optical preform, comprising:
placing an internal-vapor-deposition machine in a reduced-moisture environment having a moisture content of less than 5 g/kg;
maintaining the reduced-moisture environment's moisture content of less than 5 g/kg for a period of at least seven days;
positioning a glass substrate tube in the internal-vapor-deposition machine within the reduced-moisture environment;
depositing glass-forming compounds onto the interior surface of the glass substrate tube via PCVD deposition or MCVD deposition, wherein the glass deposition proceeds in the reduced-moisture environment, which is maintained at a moisture content of less than 5 g/kg; and
thereafter, contracting the glass substrate tube into an optical preform.

13. A method according to claim 12, wherein the glass deposition step proceeds in a reduced-moisture environment that is maintained at a moisture content of less than 2 g/kg.

14. A method according to claim 12, wherein the step of contracting the glass substrate tube into an optical preform is performed in an environment having a moisture content of less than 5 g/kg.

15. A method according to claim 12, wherein the step of contracting the glass substrate tube into an optical preform is performed in a reduced-moisture environment having a moisture content of less than 2 g/kg.

16. A method according to claim 12, wherein the deposition step comprises a PCVD deposition step.

* * * * *